United States Patent
Lo Iacono et al.

(10) Patent No.: US 7,436,963 B2
(45) Date of Patent: Oct. 14, 2008

(54) PROCESS FOR GENERATING CODES FOR CDMA COMMUNICATIONS, SYSTEM AND COMPUTER PROGRAM PRODUCT THEREFOR

(75) Inventors: Daniele Lo Iacono, Reggio Calabria (IT); Ettore Messina, Crozet (FR); Giuseppe Avellone, Palermo (IT); Agostino Galluzzo, Palma di Montechiaro (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 780 days.

(21) Appl. No.: 10/383,872

(22) Filed: Mar. 7, 2003

(65) Prior Publication Data

US 2003/0223397 A1 Dec. 4, 2003

(30) Foreign Application Priority Data

Mar. 7, 2002 (EP) .................................. 02425130

(51) Int. Cl.
*H04B 7/216* (2006.01)

(52) U.S. Cl. ...................................... 380/268; 380/270
(58) Field of Classification Search ...................... 713/1, 713/2, 188, 194; 380/200, 201, 255, 277, 380/268; 726/2; 370/342, 206
See application file for complete search history.

(56) References Cited

U.S. PATENT DOCUMENTS 5,926,070 A 7/1999 Barron et al. .................. 331/78

(Continued)

FOREIGN PATENT DOCUMENTS

EP 0963070 12/1999

(Continued)

OTHER PUBLICATIONS

Universal Mobile Telecommunications Systems (UMTS) Spreading and Modulation (FDD) (3G TS 25.213 Version 3.2.0 Release 1999), ETSI TS 125 213 V3.2.0, Mar. 2000, pp. 1-27, XP002203809.

(Continued)

*Primary Examiner*—Kimyen Vu
*Assistant Examiner*—Joseph Pan
(74) *Attorney, Agent, or Firm*—Lisa K. Jorgenson; Allen, Dyer, Doppelt, Milbrath & Gilchrist (57) ABSTRACT

To generate the main scrambling code of order N and the secondary scrambling code of order K within the set identified by the primary scrambling code of order N, a first m-sequence and a second m-sequence are generated using Fibonacci linear feedback shift registers. The first m-sequence and the second m-sequence are modulo-2 added to form the I branch of the primary scrambling code. A first T-bit masking word and a second T-bit masking word of rank 0 are generated that correspond to the polynomial time shifts, and the intermediate taps of the X and y registers respectively chosen by the masking words are modulo-2 added so as to generate a third sequence and a fourth sequence, which are modulo-2 added together to form the Q branch of the primary scrambling code. Starting from the least significant Kmax bits of the register X, of the K-th intermediate tap corresponding to the secondary scrambling code of order K within the set identified by the primary scrambling code of order N, a fifth sequence is generated, which, modulo-2 added to the second sequence, forms the I branch of the secondary scrambling code. By modulo-2 summing the intermediate taps of the register X masked by the first masking word of rank N, a sixth sequence is generated, which, modulo-2 added to the fourth sequence, forms the Q branch of the secondary scrambling code.

24 Claims, 4 Drawing Sheets

U.S. PATENT DOCUMENTS

| | | | | |
|---|---|---|---|---|
| 5,943,361 | A * | 8/1999 | Gilhousen et al. | 375/142 |
| 6,141,374 | A * | 10/2000 | Burns | 375/152 |
| 6,445,714 | B1 * | 9/2002 | d'Anjou et al. | 370/441 |
| 6,459,883 | B2 * | 10/2002 | Subramanian et al. | 455/67.11 |
| 6,567,017 | B2 * | 5/2003 | Medlock et al. | 341/50 |
| 2002/0011940 | A1 * | 1/2002 | Cappel | 340/994 |

FOREIGN PATENT DOCUMENTS

| | | |
|---|---|---|
| WO | 01/05079 | 1/2001 |

OTHER PUBLICATIONS

Linear Feedback Shift Registers, May 19, 2001, XP002211559, Retrieved from the Internet: http://www.amug.org/ahmrphd/LFSR.html, retrieved on Aug. 28, 2002.

Universal Mobile Telecommunications Systems (UMTS) Spreading and Modulation (FDD) (3G TS 25.213 Version 3.2.0 Release 1999), ETSI TS 125 213 V3.2.0, Mar. 2000, pp. 1-27, XP002203809.

Linear Feedback Shift Registers, May 19, 2001, XP002211559, Retrieved from the Internet: http://www.amug.org/ahmrphd/LFSR.html, retrieved on Aug. 28, 2002.

* cited by examiner

PROCESS FOR GENERATING CODES FOR CDMA COMMUNICATIONS, SYSTEM AND COMPUTER PROGRAM PRODUCT THEREFOR

FIELD OF THE INVENTION

The present invention relates to techniques for the generation of codes for Code Division Multiple Access (CDMA) applications and has been developed with particular attention to its application for the generation of scrambling codes used at the level of down-link (DL) connections, for example, in mobile communication networks operating according to the UMTS (Universal Mobile Telecommunication System) standard. The present invention can be used for the generation of DL scrambling codes in FDD-UMTS modems, for example, as defined in the standard Spreading and Modulation (FDD), 3GPP TS 25.213 v3.50, RAN-WG1.

BACKGROUND OF THE INVENTION

The specific field of application referred to above dates back to relatively recent times. Consequently, there does not exist extensive literature regarding the generation of scrambling codes in a UMTS context. Of course, there exists an extensive literature on the generation of orthogonal codes for CDMA applications, in particular, in W-CDMA (wideband CDMA) systems. The corresponding mechanisms of generation are substantially comparable to the mechanisms of generating pseudorandom noise (PN).

In this connection, useful reference may be made to the following: Roger L. Peterson, Introduction to Spread Spectrum Communications, Prentice Hall; Esmael H. Dinan and Bijan Jabbari, Spreading Codes for Direct Sequence CDMA and Wideband CDMA Cellular Networks, IEEE Comm Magazine, 1998; and Savo G. Glisic, International Courses for Telecom Professionals, Course 879, 1998. With specific regard to applications in a UMTS context, reference may be made, for instance, to the document WO-A-01/05079.

In order to generate scrambling codes for UMTS applications, usually two Linear Feedback Shift Registers (LFSRs) are used. One is called X (first) and the other Y (second) and each one generates a binary m-sequence. The modulo-2 sum of the two sequences thus obtained is referred to as a Gold sequence. A code used for UMTS applications is a complex sequence made up of a pair of Gold sequences referred to as the I branch and the Q branch.

The approach described in the document WO-A-01/05079 envisages the generation of primary and secondary codes by using a masking section. The masking section is used only for generating the I branch, while the Q branch is generated by delaying the I branch. The fact of using a delay line for shifting the code involves an unacceptable latency. Also, implementation of the delay line proves to be a problem, and in fact, the document in question makes no mention of just how the desired immediate delay can be obtained.

SUMMARY OF THE INVENTION

The main purpose of the present invention is to overcome the difficulties and drawbacks associated with the approaches referred to above.

The invention relates to the corresponding system, as well as to the corresponding computer program product which can be directly loaded into the internal memory of a digital computer and which, when run on a computer, implements the process according to the invention.

The present invention enables generation of both the I component and the Q component of the code without using a delay line. Since the secondary codes for the I branch within a set identified by a primary code are all available on the intermediate taps of the X register, X LFSR, the I branch is generated by choosing the taps appropriately according to the number of the secondary code. This makes it possible to avoid resorting to the complex masking section described in the document WO-A-01/05079.

The secondary codes for the Q branch are generated using a programmable XOR matrix to enable modulo-2 addition of the intermediate taps of the X register, X LFSR, according to the number of the secondary code. For this purpose, a small look-up table may be used, or, alternatively it is possible to identify the taps by using a Galois LFSR associated with the polynomial that generates the X LFSR. This alternative approach enables a reduction in the area occupied on the silicon but entails a small latency for determination of the taps.

Preferably, all the primary scrambling codes are generated by loading the X LFSR with an adequate initial state, while all the secondary codes within each set identified by a primary code are generated by summing a certain number of translated or shifted replicas of the same primary-code sequence. The present invention thus enables a reduction in the memory required for storing the values of the initial taps for all the codes.

As stated above, it possible to generate both the primary code and a secondary code (main code and/or alternative code) within the selected set of codes without having to use a delay line on the Q branch. In a first embodiment, a small look-up table is used for generating the secondary codes. In a second embodiment, the small look-up table is adopted also for generating the alternative codes, thus reducing internal-memory requirements. Using one or more Galois LFSRs for determining the values associated to the taps for generation of the secondary codes enables, as stated above, the size of the memory is reduced, provided that a certain penalty in terms of latency is acceptable.

BRIEF DESCRIPTION OF THE DRAWINGS

The present invention will now be described, purely by way of non-limiting examples, with reference to the attached drawings, in which.

DETAILED DESCRIPTION OF THE PREFERRED EMBODIMENTS

Introduction to the theoretical foundations of the invention will now be discussed. As a foreword to the description of the example embodiments of the invention, it may be useful to recall the criteria used for generating-scrambling codes for applications in a UMTS context. The set of complex scrambling codes for UMTS applications described in the above-mentioned standard 3GPP TS comprises in all $n=2^{18}-1=262143$ different codes. In practice, only one small subset of the set is used.

Scrambling codes are divided into 512 sets, each of which comprises a primary scrambling code (PSC), which identifies it, and fifteen secondary scrambling codes (SSCs). The PSCs are defined by 16.i scrambling codes, where $i \in [0 \ldots 511]$, while the SSCs of the set corresponding to the i-th PSC comprises 16.i+k scrambling codes, where $k \in [1 \ldots 15]$. Consequently, the set of codes that is used comprises 8192 scrambling codes, which corresponds to $$N=16.i+k$$

where $i \in [0 \ldots 511]$ and $k \in [0 \ldots 15]$.

Each of these codes is associated with two sets of alternative codes which may be used in a compressed mode. The left-hand alternative code corresponding to the scrambling code n is the code number n+8192, while the right-hand alternative code corresponding to the scrambling code n is the code with number n+16384. Hence, altogether 3×8192 codes are generated.

Figure 1:
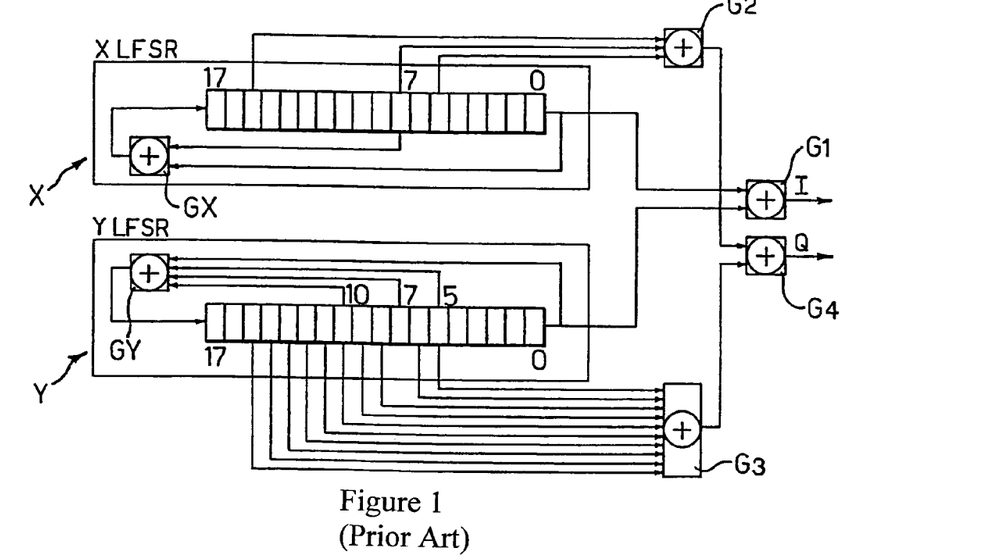
FIG. 1 is a schematic illustration of the criteria adopted for generating complex scrambling codes applicable in a UMTS context according to the prior art.

The operation for generating scrambling codes is performed by two Fibonacci linear feedback shift registers (LFSRs), one of which is referred to as X LFSR, and the other as Y LFSR (see FIG. 1). Each of the registers generate a binary m-sequence, referred to as maximal-length sequence (MLS).

The feedback function is performed both in the X register and in the Y register through respective XOR gates, designated by GX and GY. Yet another XOR gate, designated by G1, performs the modulo-2 addition of the two sequences generated by the X register and the Y register. This sum is again an MLS, referred to as a Gold sequence.

The complex scrambling code used in a UMTS receiver is a complex sequence made up of a pair of Gold sequences, which are referred to as the I branch and the Q branch. The output of the gate G1 represents the I branch, whereas the Q branch is generated according to criteria that will be described in greater detail below.

The two registers X and Y may be viewed as expressions of respective generating polynomials over the Galois field GF(2) (note in FIG. 1 the input connections to the gates GX and GY which perform the feedback function):

$$X(D)=1+D^7+D^{18}$$

$$Y(D)=1+D^5+D^7+D^{10}+D^{18}$$

The initial states for the X and Y LFSRs are, respectively $$x_0=[0 \ldots 0\ 1]$$

$$y_0=[1 \ldots 1\ 1]$$

To generate the set of the Gold sequences for the I branch the following formula is used:

$$z_n(i)=(x_n(i)+y(i)) \bmod 2$$

where $x_n(i)=x(i+n) \bmod (2^{18}-1))$ and $I, n \in [0 \ldots 2^{18}-2]$.

Consequently, the n-th Gold sequence can be obtained by shifting by n positions the m-sequence generated by the X LFSR. As may be inferred from the "Spreading and Modulation" standard referred to previously, the Q branch is obtained by translating the I branch by $\tau=2^{17}=131072$. This may be done by translating both of the X and Y m-sequences by T before the modulo-2 addition.

Each binary sequence is converted into the following real-valued sequence:

$$Z_n(i) = \begin{cases} +1 \text{ if } z_n(i)=0 \\ -1 \text{ if } z_n(i)=1 \end{cases}$$

with the I and Q branches that can be expressed as $$I(i)=Z_n(i)$$

$$Q(i)=Z_n((i+\tau) \bmod(2^{18}))$$

The set of complex scrambling codes may be expressed according to the following relation:

$$S_n(i)=I(i)+j \cdot Q(i)=Z_n(i)+j \cdot Z_n$$

$$((i+\tau) \bmod(2^{18}-1))$$

Again with reference to the above mentioned standard, each code corresponds to a portion of a Gold sequence equal to 38400 chips (since the UMTS Radio Frame is 38400 chips long).

Given that the index $I \in [0 \ldots 38399]$, the $\bmod(2^{18}-1)$ operator in the Q branch can be eliminated. Finally, the set of segments of Gold codes for the complex scrambling codes may be written as $$S_n(i)=I+j \cdot Q=Z_n(i)+j \cdot Z_n(i+\tau)$$

It has already been said that the n-th Gold-code segment within the set is generated by shifting the contents of the X LFSR by n positions. It may be noted that any MLS generated by a k-stage LFSR is a periodic sequence of period $N=2^k-1$. Consequently, shifting by n positions can be obtained by running the generator for N-n cycles. For small values of n, the latency is unacceptable in so far as it is too high.

Since running the generator corresponds to cycling through its internal states, any shifted sequence can be generated in real time by loading the X LFSR directly with the corresponding internal state. This means that, with reference to the quantitative example mentioned previously, to store all the initial states of the X LFSR, a 3×8192×18-bit memory is required. As indicated in the work by Peterson as cited above, the modulo-2 addition of an MLS and of the sequence deriving from a phase shift of the MLS simply corresponds to yet another version of the MLS with a different phase.

This means that a shifted version of a given MLS may be generated by modulo-2 addition of a given number of intermediate taps of the LFSR. Consequently, the general diagram of the scrambling generator represented in FIG. 1 may be proposed, where G2, G3 and G4 are further XOR gates which implement the modulo-2 addition relations referred to previously. The output of the gate G4 represents the Q branch of the sequence.

The taps that are to be modulo-2 added can be determined by referring to the Galois field theory. With reference to the X LFSR-generating polynomial X(D) considered previously, shifting by n positions may be obtained by evaluating the remainder of the polynomial division $D^n/X(D)$ that is, $|D^n|_{X(D)}$.

In the example illustrated herein, from the generating polynomial X(D) it is possible to derive the equation $D^{18}=1+D^7$.

Consequently, the remainder sought can be determined by applying the above formula recursively to $D^n$ until the order of the polynomial becomes smaller than the order of X(D). As has been seen previously, the Q branch is obtained by shifting the I branch by $\tau=2^{17}$, which corresponds to the following polynomials:

$$X_Q(D) = D^4 + D^6 + D^{15}$$

$$y_Q(D) = D^5 + D^6 + D^8 + D^9 + D^{10} + D^{11} + D^{12} + D^{13} + D^{14} + D^{15}$$

Figure 2:
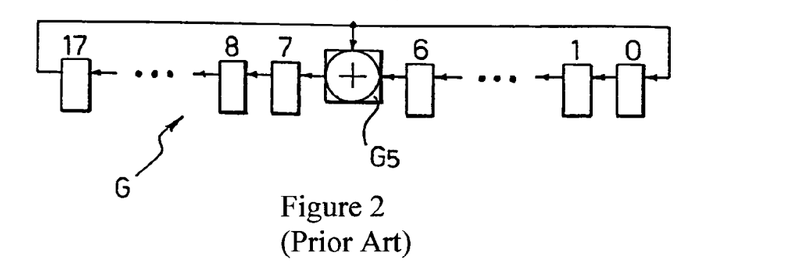
FIG. 2 illustrates the use of a Galois register for determining the values of the taps according to the prior art.

The values of the polynomial taps may thus be calculated by running an appropriately feedback Galois LFSR of the type designated by G in FIG. 2. This is a shift register corresponding to the generating polynomial X(D), the reference G5 indicating, as previously, a logic XOR gate. The value of the internal state of the Galois register in question after n cycles corresponds to the remainder sought.

In order to avoid any latency, it is necessary to have available a 3×8192-bit memory so as to store all the values of the pre-determined taps for any possible shift considered. The amount of memory required may be reduced by using only the initial states of the X LFSR for the primary scrambling codes and by generating, instead, all the secondary scrambling codes, using the shift-and-add property just described. Since the binary number that identifies the secondary scrambling codes is represented as modulo-16, just 15 taps are needed for generating all the secondary scrambling codes within any chosen PSC set.

To generate the complete set of complex scrambling codes, it is necessary to generate both the main codes and the alternative (left-hand and right-hand) codes. This requires a 3×512×18-bit memory for storing all the initial states for the primary scrambling codes, as well as a small 15×18-bit look-up table for storing only the intermediate taps of the secondary scrambling codes of the Q branch.

The I branch can be obtained simply by choosing one of the intermediate taps of the X LFSR: since n ϵ [1 . . . 16], the polynomial division seen previously can be reduced to $D^n$. The look-up table of the Q branch can be filled by applying the polynomial division to the polynomial $X_Q(D)$ seen previously, where the index n is within the range n ϵ [1 . . . 16].

It is possible to achieve a further reduction in the memory required by storing only the initial states of the X LFSR that are linked to the main primary scrambling codes and by generating the left-hand and right-hand alternative codes (both for the PSCs and for the SSCs), again using the shift-and-add property referred to previously.

In this way, a 512×18-bit memory is required for storing the initial states of the primary scrambling codes and a bank of five look-up tables is required. Each look-up table has 15×18 bits for storing the intermediate taps for the secondary scrambling codes. The Q branch is for the main codes, and both the I branch and the Q branch are for the alternative codes.

The I branch for the left-hand and right-hand PSCs can be generated by respectively shifting the I branch of the primary scrambling code by 8192 and 16394 positions. Applying the polynomial division seen previously, the following polynomials can be determined:

$$X_{LI}(D) = D + D^2 + D^3 + D^5 + D^9 + D^{10} + D^{13} + D^{14} + D^{15} + D^{17}$$

$$X_{RI}(D) = 1 + D + D^4 + D^5 + D^6 + D^7 + D^9 + D^{15} + D^{16} + D^{17}$$

The Q branch for the left-hand and right-hand primary scrambling codes, and the I branch of the main primary scrambling code must be respectively shifted by 8192+τ and 16384+τ positions, where τ is the parameter defined previously.

Taking into account that $$X_{LQ}(D) = 1 + D + D^3 + D^{14} + D^{15} + D^{17}$$

$$X_{RQ}(D) = D + D^2 + D^4 + D^7 + D^{12} + D^{14} + D^{16}$$

the values to be stored in the look-up tables for the secondary scrambling codes may be obtained by applying the polynomial division to the two polynomials referred to above, where the index n is in the set n ϵ [1 . . . 16].

Also in this case, the intermediate taps of the secondary scrambling codes can be generated using, in parallel, five Galois registers of the LFSR type referred to previously (FIG. 2), initialized with the polynomials seen with reference to the polynomials $X_Q(D)$, $y_Q(D)$, $X_{LI}(D)$, $X_{RI}(D)$, $X_{LQ}(D)$, and $X_{RQ}(D)$.

Each Galois register cycles n times through its internal states, where n ϵ [1 . . . 16] represents the number of the secondary scrambling code chosen within the set defined by the corresponding primary scrambling code. After n cycles, the internal state of a Galois LFSR represents the intermediate taps of the X LFSR that are to be modulo-2 added. In any case, a memory is required for storing at least the initial states of the X LFSR linked to the main primary scrambling codes. For implementation of the memories, two alternatives may be considered: memory directly accessible by the generator (embedded static memory); and forwarding of the initial state to the generator in the form of a signal (in this case, the initial state must be recovered by the controller/DPS through its internal memory). Using an embedded memory improves performance in terms of speed, while supplying an initial state in the form of a signal affords greater flexibility.

Implementation of a UMTS DL scrambling-code generator will now be discussed. The table below shows how the binary number representing the code number at input, designated by CodeNb, is split into three signals: the number of the secondary scrambling code (SSC), the number of the primary scrambling code (PSC), and 2 bits (code set) that identify whether a main code or an alternative (left-hand or right-hand) code is to be generated.

| CodeNb bits | | Function | |
|---|---|---|---|
| 3-0 | | SSC number | |
| 12-4 | | PSC number | |
| 14-13 | 00 | | main |
| | 01 | code | left-hand |
| | 10 | set | right-hand |
| | 11 | | |

Figure 3:
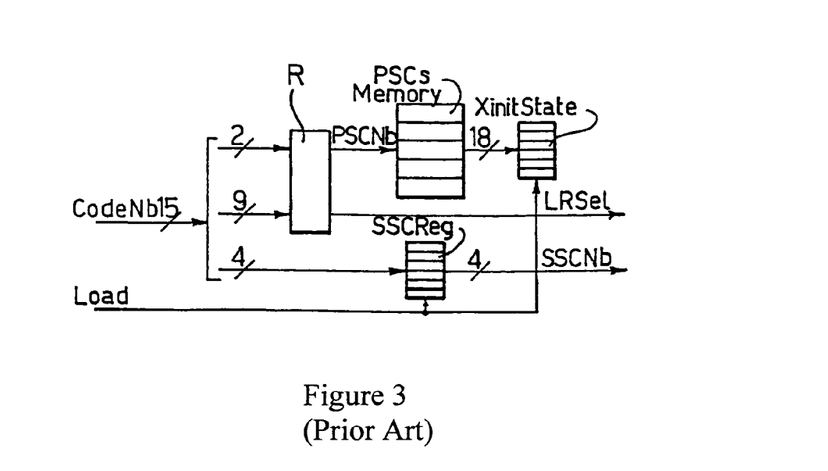
FIG. 3 illustrates loading of the numbers of the codes according to the prior art.

With reference to the diagram of FIG. 3, as soon as the loading signal, designated by Load, is driven high, the number of the secondary scrambling code SSCNb is loaded into the register SSCReg, while the initialization state of the X LSFR, recovered by the memory PSCsMemory addressed by the primary-scrambling-code number PSCNb, is loaded into the state register XinitState.

The nature of the logic network designated by R, which is a combination network, depends upon the particular implementation, but is not in itself of any critical importance for the purposes of implementation of the present invention.

Figure 4:
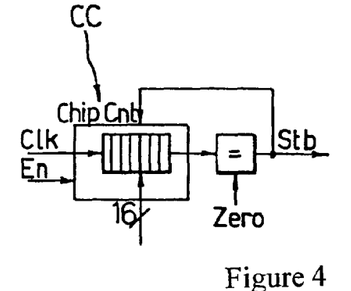
FIG. 4 illustrates, in the form of a block diagram, the structure of a counter used within a system according to the present invention.

During normal operation, it is possible to load a different code number CodeNb by driving the Load line high. In this case, the first bit of the new code is available for the next clock cycle. Since the sequence generated must be truncated at 38400 bits, a chip counter that keeps track of the number of chips is required. This counter, designated by CC in FIG. 4, is pre-loaded with the length of the scrambling code Scr-CodeLen. As soon as counting of the counter ChipCnt reaches 0, the corresponding strobe signal Stb is driven high, and the counter is reset.

The signal Stb is used for re-loading both of the X LFSR and the Y LFSR with the pre-stored initial values of the primary scrambling codes, respectively designated by XinitState and YinitState. The secondary scrambling codes within a set defined by a primary scrambling code can be generated either by pre-storing the polynomial taps in a memory or by generating the values directly by a set of Galois LFSRs.

Figure 5:
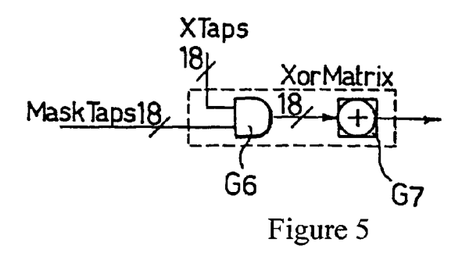
FIG. 5 illustrates the basic element of an XOR matrix used in the framework of the present invention.

In any case, on the X LFSR a programmable XOR matrix is implemented of the type represented in FIG. 5, where the reference G6 designates an AND gate and the reference G7 an XOR gate. The above matrix includes an 18-bit vector Xor-Matrix masked by the signal MaskTaps coming either from a 15×18-bit look-up table or from a Galois LFSR, according to the implementation. The signal MaskTaps selects the values XTaps coming from the internal states of the X LFSR that are to be modulo-2 added.

Figure 6:
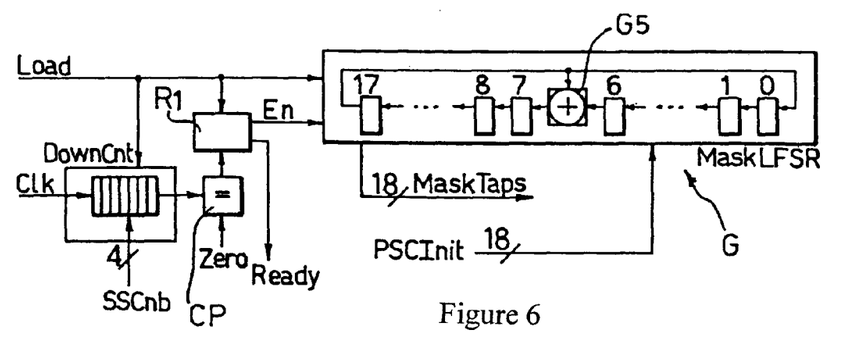
FIG. 6 illustrates, again in the form of a block diagram, according to the present invention the control logic of a Galois register of the type illustrated in FIG. 2.

With reference to the diagram of FIG. 6, it may be noted how calculation of the intermediate values MaskTaps that are to be modulo-2 added can be performed by a Galois LFSR of the type represented in FIG. 2. In order to start the generator upon a request for loading (Load) and to stop it when an adequate internal state is reached, it is necessary to add a control logic. The network R1 of FIG. 6 supplies an enabling signal En to the generator, as well as a signal Ready, which is designed to indicate the validity of the signal MaskTaps.

As soon as the signal Load goes high, the Galois generator is initialized with the adequate initial value PSCInit, while the number of the secondary scrambling code SSCNb is loaded into the down counter DownCnt clocked by the clock signal Clk. The signal En supplied to the register causes the latter to cycle through its internal states until the counter reaches zero. This is detectable by a comparator designated as CP. The enabling-control signal is then driven low so as to freeze the internal state of the register at the desired values.

Figure 7:
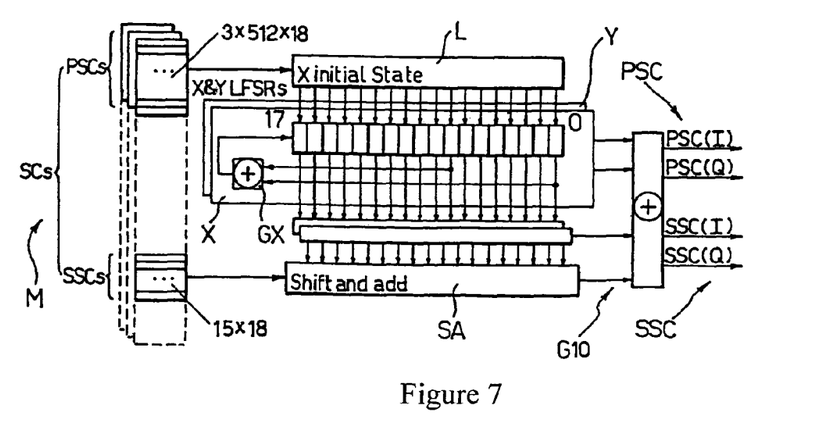
FIG. 7 illustrates the general structure of a code generator according to the present invention.
Figure 8:
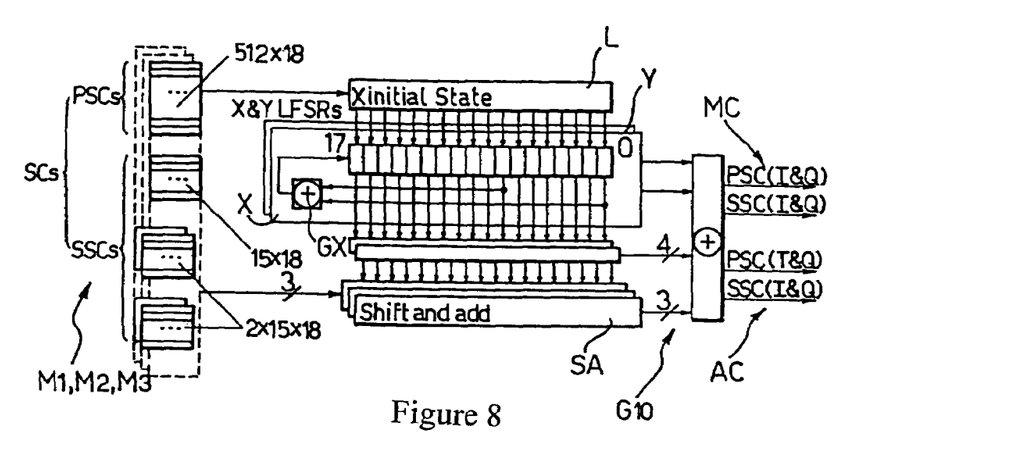
FIG. 8 illustrates a second embodiment of the present invention.
Figure 9:
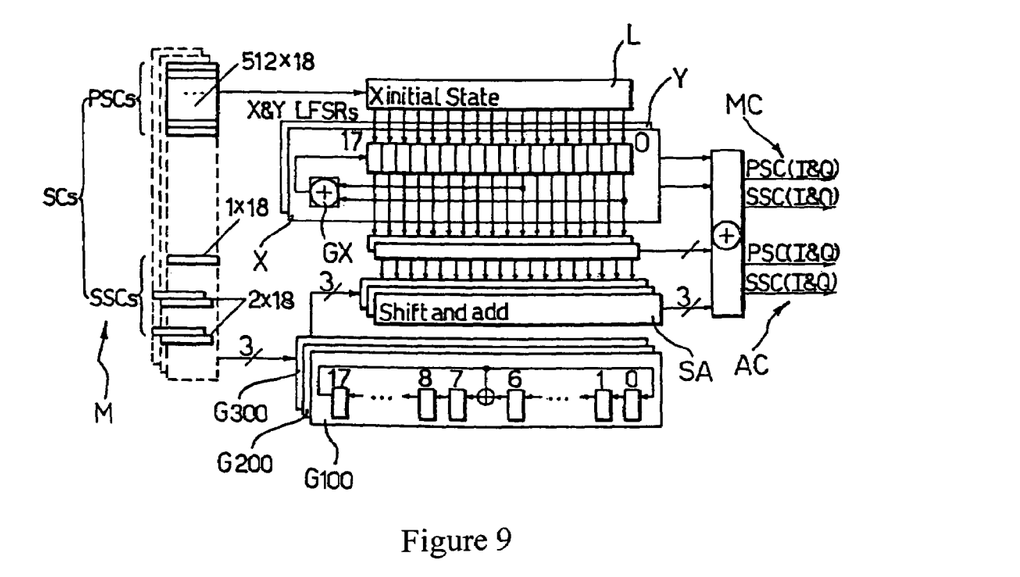
FIG. 9 illustrates a third embodiment of the present invention.

The diagrams of FIGS. 7, 8 and 9 (where the same references as those already used for the previous figures have been adopted) represent different possible embodiments of a generator according to the invention.

The first embodiment of a generator according to the invention, represented in FIG. 7, is able to generate simultaneously a primary scrambling code (either a main one or an alternative one) and a secondary scrambling code within the set chosen. The generator uses, in addition to the X LFSR and the Y LFSR described previously, with the corresponding output gates associated thereto, designated collectively by G10, a 3×512×18-bit memory M for storing all the initial states of the main codes, both left-hand and right-hand ones. The reference L and SA respectively designate a register for loading the initial state into the X LFSR and a register which performs the shift-and-add function.

Both the embodiment of FIG. 8 and the embodiment of FIG. 9 are able to generate simultaneously two primary scrambling codes PSC (main codes and corresponding left-hand and right-hand alternative codes) and a secondary scrambling code SSC for each selected set of scrambling codes (hence, a total of two secondary scrambling codes).

The two embodiments represented in FIGS. 8 and 9 differ primarily in the way in which the secondary scrambling codes are obtained. For the reasons already recalled previously, the second embodiment (FIG. 8) uses three look-up tables M1, M2, and M3 for storing all the intermediate values for the Q branch of the main codes and for both the I branch and Q branch of the left-hand and right-hand alternative codes.

The third embodiment, represented in FIG. 9, uses three Galois LFSRs, designated by G100, G200 and G300, for generating the intermediate values linked to the Q branch of the main codes and to both the I branch and Q branch of the left-hand and right-hand alternative codes.

The second embodiment is able to generate both the primary scrambling code and the secondary scrambling code in a single clock cycle (in so far as the tap values are already stored in the tables M1, M2 and M3). Instead, the third embodiment requires a latency equal at the most to 16 clock cycles for generating the secondary scrambling code, in so far as the Galois LFSRs must cycle through their internal states.

The second embodiment calls for a certain amount of space on the silicon (in so far as a 15×18 look-up table is more burdensome to implement than-is an 18-tap LFSR). In brief, the approach according to the invention makes it possible to generate scrambling codes for CDMA communications, wherein the codes have an I branch and a Q branch.

In more general terms, execution of the following operations is planned:

generating, using an X and Y LFSR, a first m-sequence and a second m-sequence, then modulo-2 adding the first sequence and the second sequence so as to form the I branch of the scrambling codes;

generating a first masking word X0-MASK and a second masking word Y0-MASK corresponding to respective polynomial time shifts X0(D) and Y0(D); and modulo-2 adding the intermediate taps of the X and Y register chosen using the first and second masking words X0-MASK and Y0-MASK so as to generate a third sequence and a fourth sequence, then modulo-2 adding the third sequence and fourth sequence to form the Q branch of the scrambling codes.

Preferably, the codes are organized in primary scrambling codes (PSCs) and secondary scrambling codes (SSCs) having an I branch and a Q branch. To generate the primary scrambling code of order N, where N is between 0 and Nmax, and the secondary scrambling code of order K, where K is between 1 and Kmax, within the set identified by the primary scrambling code of order N, the following operations are planned:

a) generating a first m-sequence using a T-bit Fibonacci LFSR, designated as X, corresponding to a first polynomial X(D) over the Galois field GF(2) and initialized with a first T-bit initialization word of rank N, XN-INIT, corresponding to the primary scrambling code of order N;

b) generating a second m-sequence using a Fibonacci LFSR, designated as Y, corresponding to a second polynomial Y(D) over the Galois field GF(2) and initialized with a second T-bit initialization word of rank 0, Y0-INIT;

c) modulo-2 adding the first sequence and the second sequence so as to form the I branch of the primary scrambling code;

d) generating a first T-bit masking word of rank 0, X0-MASK, corresponding to the polynomial time shift X0(D) and modulo-2 adding the intermediate taps of the register X chosen using the first masking word X0-MASK, so as to generate a third sequence;

e) generating a second T-bit masking word of rank 0, Y0-MASK, corresponding to the polynomial time shift Y0(D) and modulo-2 adding the intermediate taps of the register Y chosen using the second masking word Y0-MASK, so as to generate a fourth sequence;

f) modulo-2 adding the third sequence and the fourth sequence so as to form the Q branch of the primary scrambling code;

g) starting from the least significant Kmax bits of the register X, choosing the K-th intermediate tap corresponding to the secondary scrambling code of order K within the set, so as to generate a fifth sequence;

h) modulo-2 adding the second sequence and the fifth sequence so as to form the I branch of the secondary scrambling code;

i) modulo-2 adding the intermediate taps of the register X masked by the first masking word of rank N, XN-MASK, so as to generate a sixth sequence; and j) modulo-2 adding the fourth sequence and the sixth sequence so as to form the Q branch of the secondary scrambling code.

In a preferred way, the invention comprises the operation of generating the Nmax first initialization words of rank N, XN-INIT, corresponding to all the initial states of the primary scrambling codes. This operation comprises the steps of:

initializing the register X with the first initialization word of rank N, XN-INIT, corresponding to N=0;

determining the operation of the register X, obtaining its state of operation after a number of cycles equal to Kmax; and stopping the register X after completion of a number of cycles equal to Nmax·Kmax.

Again in a preferred way, the invention further comprises the operation of evaluating the Kmax first masking words of rank N, XN-MASK, corresponding to all the secondary scrambling codes within the set. The evaluation operation comprises the steps of:

initializing at least one Galois LFSR, G, associated to the polynomial X(D), with the first initialization word of rank N, XN-INIT, corresponding to the set;

running the Galois register G, detecting its state at each cycle; and stopping the Galois register G after a number of cycles equal to Kmax.

Nmax is usually chosen equal to 511+2×512 for generating the primary scrambling code of order N, both as a main code and as a left-hand or right-hand alternative code, and the secondary scrambling code of order K, within said set.

In the currently preferred embodiment of the invention, there are simultaneously generated the primary scrambling code of order N, both as a main code and as a left-hand or right-hand alternative code, and the secondary scrambling code of order K, again both as a main code and as a left-hand or right-hand alternative code, within the set. The operation of simultaneous generation comprises the steps of:

a) modulo-2 adding the intermediate taps of the register X chosen with a first T-bit masking word of rank X0I (X0I-MASK), the first masking word of rank X0I being chosen as corresponding to the polynomial time shift X0I(D) so as to generate a seventh sequence;

b) modulo-2 adding the second sequence and the seventh sequence so as to form the I branch of the alternative primary scrambling code;

c) modulo-2 adding the intermediate taps of the register X chosen with a first T-bit masking word of rank X0Q (X0Q-MASK), the first masking word of rank X0Q being chosen as corresponding to the polynomial time shift X0Q(D), so as to generate an eighth sequence;

d) modulo-2 adding the fourth sequence and the eighth sequence so as to form the Q branch of the alternative primary scrambling code;

e) modulo-2 adding the intermediate taps of the register X masked by means of a first masking word of rank XNI, XNI-MASK, so as to generate a ninth sequence;

f) modulo-2 adding the second sequence and the ninth sequence so as to form the I branch of the alternative secondary scrambling code;

g) modulo-2 adding the intermediate taps of the register X masked by using a first masking word of rank XNQ, XNQ-MASK, so as to generate a tenth sequence; and h) modulo-2 adding the fourth sequence and the tenth sequence so as to form the Q branch of the alternative secondary code.

Moreover, preferably planned is the evaluation, using at least one Galois register G, of the Kmax first masking words of rank XNI, XNI-MASK, and of the Kmax first masking words of rank XNQ, XNQ-MASK, corresponding to all the left-hand or right-hand alternative secondary scrambling codes within the set of codes defined by the primary scrambling code of order N, also in relation to the corresponding left-hand or right-hand alternative codes.

In a preferred way the range of variation of Nmax is chosen equal to any multiple of a power of 2; Kmax is chosen equal to any power of 2, so that Kmax≦Nmax; and T is any number whereby Kmax<T<Nmax.

In a preferred way, the corresponding system comprises a memory M for storing the first initialization words of rank N, XN-INIT, that correspond to all the initial states of the primary scrambling codes.

The main advantage of the invention is that it can generate both primary codes and secondary codes without any need for a delay line on the Q branch and with the use of a small look-up table for generating the secondary codes. The second embodiment described makes it possible to reduce the memory area by using a small look-up table also for the generation of the alternative codes. The third embodiment enables a further reduction in the memory area by generating the secondary codes by using a Galois LFSR.

Figure 10:
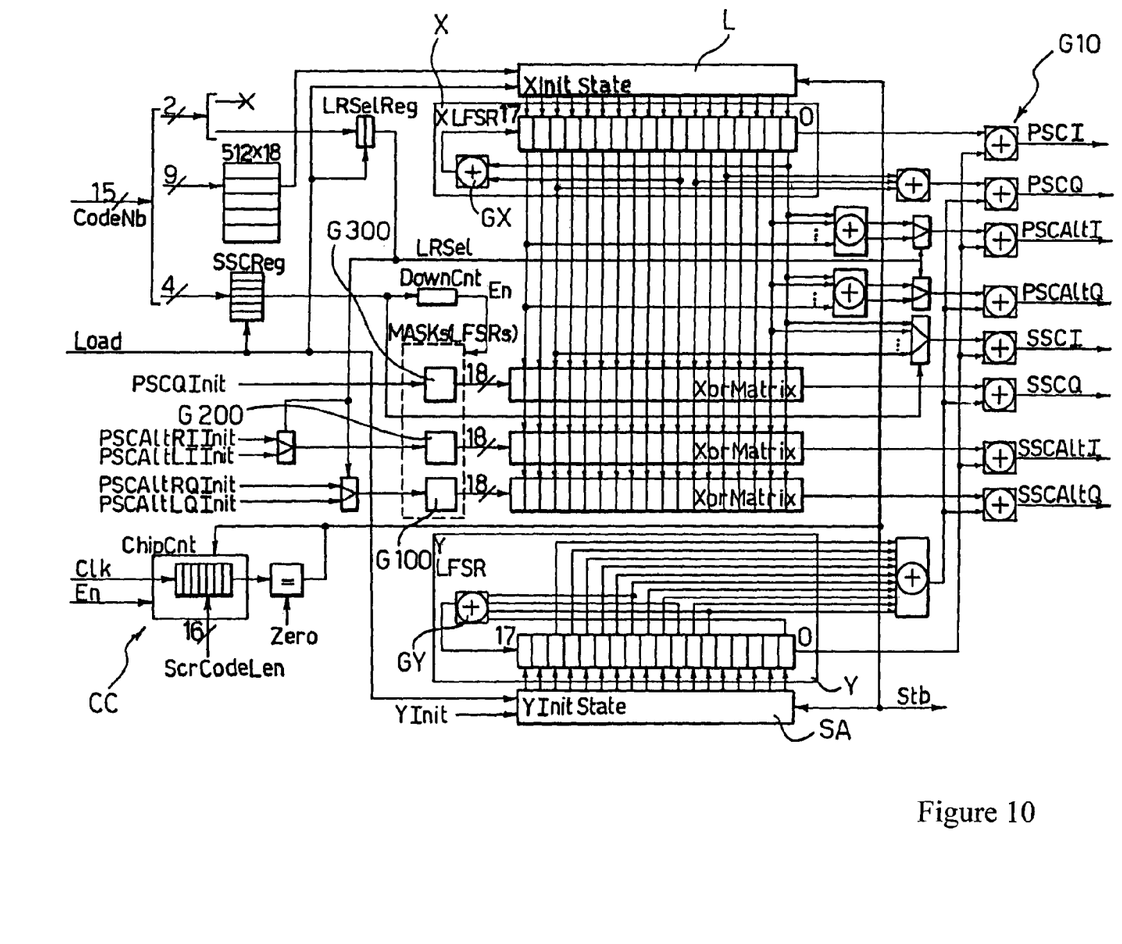
FIG. 10 is a more detailed block diagram of the third embodiment illustrated in FIG. 9.

It will moreover be appreciated that all the embodiments described can be readily adapted, for example, to the specific internal architecture of a UMTS modem, in particular, by resorting to an architecture of the type represented in FIG. 10, which substantially corresponds to the embodiment illustrated in FIG. 9.

The approach according to the invention is suitable for implementation both at the level of a specialized circuit and at the level of a general-purpose processor (for example, a DSP) appropriately programmed with a corresponding computer program product.

Of course, without prejudice to the principle of the invention, the details of construction and the embodiments may vary widely with respect to what is described and illustrated herein purely by way of example, without departing from the scope of the present invention as defined in the attached claims.

That which is claimed is:

1. A process for generating scrambling codes for CDMA communications, the scrambling codes having an I branch and a Q branch, the process comprising:

generating, using first and second linear-feedback-shift-registers, a first m-sequence and a second m-sequence, then modulo-2 adding the first m-sequence and the second m-sequence to form the I branch of the scrambling codes;

generating a first masking word and a second masking word corresponding to respective polynomial time shifts; and modulo-2 adding intermediate taps of the first and second linear-feedback-shift-registers chosen using the first and second masking words so as to generate a third sequence and a fourth sequence, then modulo-2 adding the third sequence and fourth sequence to form the Q branch of the scrambling codes, with the Q branch being obtained by translating the I branch by $\tau=2^{17}$, with the taps of the first linear-feedback-shift-register corresponding to a polynomial of $D^4+D^6+D^{15}$ and the taps of the second linear-feedback-shift-register corresponding to a polynomial of $D^5+D^6+D^8+D^9+D^{10}+D^{11}+D^{12}+D^{13}+D^{14}+D^{15}$ for providing the translation.

2. A process according to claim 1, wherein the process is implemented in a mobile communication network operating according to a Universal Mobile Telecommunication System (UMTS) standard, the UMTS standard comprising 3GPP TS 25.213.

3. A process according to claim 1, wherein the process is implemented via executable modules on a computer readable medium.

4. A process for generating scrambling codes for CDMA communications, the scrambling codes being organized in primary scrambling codes and secondary scrambling codes having an I branch and a Q branch, and including a primary scrambling code of order N, where N is between 0 and Nmax, and a secondary scrambling code of order K, where K is between 1 and Kmax, within a set identified by the primary scrambling code of order N, the process comprising:
  a) generating a first in-sequence using a first T-bit Fibonacci linear feedback shift register, designated as X, corresponding to a first polynomial over a Galois field and initialized with a first T-bit initialization word of rank N, corresponding to the primary scrambling code of order N;
  b) generating a second in-sequence using a second T-bit Fibonacci linear feedback shift register, designated as Y, corresponding to a second polynomial over the Galois field and initialized with a second T-bit initialization word of rank 0;
  c) modulo-2 adding the first sequence and the second sequence so as to form the I branch of the primary scrambling code;
  d) generating a first T-bit masking word of rank 0 corresponding to a polynomial time shift, and modulo-2 adding intermediate taps of the register X chosen using the first masking word, so as to generate a third sequence;
  e) generating a second T-bit masking word of rank 0 corresponding to a polynomial time shift and modulo-2 adding intermediate taps of the register Y chosen using the second masking word, so as to generate a fourth sequence;
  f) modulo-2 adding the third sequence and the fourth sequence so as to form the Q branch of the primary scrambling code, with the Q branch being obtained by translating the I branch of the primary scrambling code by $\tau=2^{17}$, with the taps of the register X corresponding to a polynomial of $D^4+D^6+D^{15}$ and the taps of the register Y corresponding to a polynomial of $D^5+D^6+D^8+D^9+D^{10}+D^{11}+D^{12}+D^{13}+D^{14}+D^{15}$ for providing the translation;
  g) starting from least significant Kmax bits of the register X, choosing a K-th intermediate tap corresponding to a secondary scrambling code of order K within the set, so as to generate a fifth sequence;
  h) modulo-2 adding the second sequence and the fifth sequence so as to form the I branch of the secondary scrambling code;
  i) modulo-2 adding the intermediate taps of the register X masked using the first masking word of rank N, so as to generate a sixth sequence; and
  j) modulo-2 adding the fourth sequence and the sixth sequence so as to form the Q branch of the secondary scrambling code, with the Q branch being obtained by translating the I branch of the secondary scrambling code by $\tau=2^{17}$.

5. A process according to claim 4, further comprising generating Nmax first initialization words of rank N, corresponding to all the initial states of the primary scrambling codes, the generating comprising:
  initializing the register X with the first initialization word of rank N, corresponding to N=0;
  determining operation of the register X, and obtaining its state of operation after a number of cycles equal to Kmax; and
  stopping the register X after completion of a number of cycles equal to Nmax·Kmax.

6. A process according to claim 4, further comprising evaluating the Kmax first masking words of rank N corresponding to all the secondary scrambling codes within the set, the evaluating comprising:
  initializing at least one Galois shift register associated with the polynomial with the first initialization word of rank N corresponding to the set;
  running the at least one Galois register, detecting its state at each cycle; and
  stopping the at least one Galois register after a number of cycles equal to Kmax.

7. A process according to claim 6, further comprising evaluating, by using the at least one Galois register, the Kmax first masking words of rank XNI and the Kmax first masking words of rank XNQ corresponding to all the left-hand or right-hand alternative secondary scrambling codes within the set of codes defined by the primary scrambling code of order N, also in relation to the corresponding left-hand or right-hand alternative codes.

8. A process according to claim 4, wherein Nmax is chosen equal to 511+2×512 for generating the primary scrambling code of order N, both as a main code and as a left-hand or right-hand alternative code, and the secondary scrambling code of order K, within the set.

9. A process according to claim 4, further comprising simultaneously generating the primary scrambling code of order N, both as a main code and as a left-hand or right-hand alternative code, and the secondary scrambling code of order K, again both as a main code and as a left-hand or right-hand alternative code, within the set, the simultaneously generating comprising:
  a) modulo-2 adding the intermediate taps of the register X chosen with a first T-bit masking word of rank X0T, the first masking word of rank X0I being chosen as corresponding to a polynomial time shift so as to generate a seventh sequence;
  b) modulo-2 adding the second sequence and the seventh sequence so as to form the I branch of the alternative primary scrambling code;
  c) modulo-2 adding the intermediate taps of the register X chosen with a first T-bit masking word of rank X0Q, the first masking word of rank X0Q being chosen as corresponding to the polynomial time shift, so as to generate an eighth sequence;
  d) modulo-2 adding the fourth sequence and the eighth sequence so as to form the Q branch of the alternative primary scrambling code;
  e) modulo-2 adding the intermediate taps of the register X masked by using a first masking word of rank XNI, so as to generate a ninth sequence;

f) modulo-2 adding the second sequence and the ninth sequence so as to form the I branch of the alternative secondary scrambling code;

g) modulo-2 adding the intermediate taps of the register X masked by using a first masking word of rank XNQ, so as to generate a tenth sequence; and h) modulo-2 adding the fourth sequence and the tenth sequence so as to form the Q branch of the alternative secondary code.

10. A process according to claim 9, further comprising evaluating, by using the Galois register, the Kmax first masking words of rank XNI and the Kmax first masking words of rank XNQ corresponding to all the left-hand or right-hand alternative secondary scrambling codes within the set of codes defined by the primary scrambling code of order N, also in relation to the corresponding left-hand or right-hand alternative codes.

11. A process according to claim 4, wherein the range of variation of Nmax is chosen equal to a multiple of any power of 2; Kmax is chosen equal to any power of 2, so that Kmax≦Nmax; and T is any number whereby Kmax<T<Nmax.

12. A process according to claim 4, wherein the process is implemented in a mobile communication network operating according to a Universal Mobile Telecommunication System (UMTS) standard, the UMTS standard comprising 3GPP TS 25.213.

13. A process according to claim 4, wherein the process is implemented via executable modules on a computer readable medium.

14. A system for generating scrambling codes for CDMA communications, the scrambling codes having an I branch and a Q branch, the system comprising:
first and second linear-feedback-shift-registers for respectively generating a first m-sequence and a second m-sequence,
a masking device for generating a first masking word and a second masking word corresponding to respective polynomial time shifts; and
a modulo-2 adder for
adding the first sequence and the second sequence to form the I branch of the scrambling codes,
adding intermediate taps of said first and second linear-feedback-shift-registers chosen using the first and second masking words so as to generate a third sequence and a fourth sequence, and
adding the third sequence and fourth sequence to form the Q branch of the scrambling codes, with the Q branch being obtained by translating the I branch by $\tau=2^{17}$, with the taps of said first linear-feedback-shift-register corresponding to a polynomial of $D^4+D^6+D^{15}$ and the taps of said second linear-feedback-shift-register corresponding to a polynomial of $D^5+D^6+D^8+D^9+D^{10}+D^{11}+D^{12}+D^{13}+D^{14}+D^{15}$ for providing the Translation.

15. A system according to claim 14, wherein the system is for operating in a mobile communication network operating according to a Universal Mobile Telecommunication System (UMTS) standard, the UMTS standard comprising 3GPP TS 25.213.

16. A system configured for generating scrambling codes for CDMA communications, the scrambling codes being organized in primary scrambling codes and secondary scrambling codes having an I branch and a Q branch, and including a primary scrambling code of order N, where N is between 0 and Nmax, and a secondary scrambling code of order K, where K is between 1 and Kmax, within a set identified by the primary scrambling code of order N, the system comprising:
a first T-bit Fibonacci linear feedback shift register, designated as X, for generating a first m-sequence, corresponding to a first polynomial over a Galois field and initialized with a first T-bit initialization word of rank N, corresponding to the primary scrambling code of order N;
a second T-bit Fibonacci linear feedback shift register, designated as Y, for generating a second m-sequence using corresponding to a second polynomial over the Galois field and initialized with a second T-bit initialization word of rank 0;
a masking device for generating a first T-bit masking word of rank 0 corresponding to a polynomial time shift, and for also generating a second T-bit masking word of rank 0 corresponding to the polynomial time shift; and
a modulo-2 adder for
adding the first sequence and the second sequence so as to form the I branch of the primary scrambling code,
adding intermediate taps of said register X chosen using the first masking word, so as to generate a third sequence;
adding intermediate taps of said register Y chosen using the second masking word, so as to generate a fourth sequence;
adding the third sequence and the fourth sequence. so as to form the Q branch of the primary scrambling code, with the Q branch being obtained by translating the I branch of the primary scrambling code by $\tau=2^{17}$, with the taps of the register X corresponding to a polynomial of $D^4+D^6D^{15}$ and the taps of the register Y corresponding to a polynomial of $D^5+D^6+D^8+D^9+D^{10}+D^{11}+D^{12}+D^{13}+D^{14}+D^{15}$ for providing the translation,
starting from least significant Kmax bits of said register X, choosing a K-th intermediate tap corresponding to a secondary scrambling code of order K within the set, so as to generate a fifth sequence,
adding the second sequence and the fifth sequence so as to form the I branch of the secondary scrambling code,
adding the intermediate taps of said register X masked using the first masking word of rank N, so as to generate a sixth sequence, and
adding the fourth sequence and the sixth sequence so as to form the Q branch of the secondary scrambling code, with the Q branch being obtained by translating the I branch of the secondary scrambling code by $\tau 2^{17}$.

17. A system according to claim 16, further comprising:
an initialization device for generating Nmax first initialization words of rank N, corresponding to all the initial states of the primary scrambling codes; and
said register X being initialized with the first initialization word of rank N, corresponding to N=0, and operation of said register X being determined after a number of cycles equal to Kmax, and said register X being stopped after completion of a number of cycles equal to Nmax·Kmax.

18. A system according to claim 16, further comprising at least one Galois shift register associated to the polynomial with the first initialization word of rank N corresponding to the set, and after initializing said at least one Galois shift register, operating said at least one Galois shift register for detecting its state at each cycle, and stopping said at least one Galois shift register after a number of cycles equal to Kmax for evaluating the Kmax first masking words of rank N corresponding to all the secondary scrambling codes within the set.

19. A system according to claim 18, wherein said at least one Galois shift register is further used for evaluating the Kmax first masking words of rank XNI and the Kmax first masking words of rank XNQ corresponding to all the left-hand or right-hand alternative secondary scrambling codes within the set of codes defined by the primary scrambling code of order N, also in relation to the corresponding left-hand or right-hand alternative codes.

20. A system according to claim 16, wherein Nmax is chosen equal to 511+2×512 for generating the primary scrambling code of order N, both as a main code and as a left-hand or right-hand alternative code, and the secondary scrambling code of order K, within the set.

21. A system according to claim 16, wherein said modulo-2 adder also performs the following:
adding the intermediate taps of said register X chosen with a first T-bit masking word of rank X0I, the first masking word of rank X0I being chosen as corresponding to a polynomial time shift so as to generate a seventh sequence;
adding the second sequence and the seventh sequence so as to form the I branch of the alternative primary scrambling code;
adding the intermediate taps of said register X chosen with a first T-bit masking word of rank X0Q, the first masking word of rank X0Q being chosen as corresponding to the polynomial time shift, so as to generate an eighth sequence;
adding the fourth sequence and the eighth sequence so as to form the Q branch of the alternative primary scrambling code;
adding the intermediate taps of said register X masked by using a first masking word of rank XNI, so as to generate a ninth sequence;
adding the second sequence and the ninth sequence so as to form the I branch of the alternative secondary scrambling code;
adding the intermediate taps of said register X masked by using a first masking word of rank XNQ, so as to generate a tenth sequence; and
adding the fourth sequence and the tenth sequence so as to form the Q branch of the alternative secondary code;
the adding for simultaneously generating the primary scrambling code of order N, both as a main code and as a left-hand or right-hand alternative code, and the secondary scrambling code of order K, again both as a main code and as a left-hand or right-hand alternative code, within the set.

22. A system according to claim 21, wherein said at least one Galois shift register is further used for evaluating the Kmax first masking words of rank XNI and the Kmax first masking words of rank XNQ corresponding to all the left-hand or right-hand alternative secondary scrambling codes within the set of codes defined by the primary scrambling code of order N, also in relation to the corresponding left-hand or right-hand alternative codes.

23. A system according to claim 16, wherein the range of variation of Nmax is chosen equal to a multiple of any power of 2; Kmax is chosen equal to any power of 2, so that $Kmax \leq Nmax$; and T is any number whereby $Kmax < T < Nmax$.

24. A system according to claim 16, wherein the system is for operating in a mobile communication network operating according to a Universal Mobile Telecommunication System (UMTS) standard, the UMTS standard comprising 3GPP TS 25.213.

* * * * *

UNITED STATES PATENT AND TRADEMARK OFFICE
CERTIFICATE OF CORRECTION

PATENT NO. : 7,436,963 B2
APPLICATION NO. : 10/383872
DATED : October 14, 2008
INVENTOR(S) : Daniele Lo Iacono et al.

It is certified that error appears in the above-identified patent and that said Letters Patent is hereby corrected as shown below:

| | |
|---|---|
| Title Page, Item (75) Inventors | Delete: "Montechiaro"<br>Insert: --Montechiaro (Agrigento)-- |
| Title Page, Item (73) Assignee | Delete: "S.r.L."<br>Insert: --S.r.l.-- |
| Column 2, Line 28 | Delete: "it possible"<br>Insert: --it is possible-- |
| Column 3, Line 11 | Delete: "generating-scrambling"<br>Insert: --generating scrambling-- |
| Column 4, Line 6 | Delete: "T"<br>Insert: --τ-- |
| Column 4, Line 10 | Delete: "$\{$ +"<br>Insert: --$\{$ +-- |
| Column 4, Line 12 | Delete: "$\{$ –"<br>Insert: --$\{$ – -- |
| Column 5, Line 12 | Delete: "appropriately"<br>Insert: --appropriate-- |
| Column 8, Line 15 | Delete: "than-is"<br>Insert: --than is-- |
| Column 11, Line 25 | Delete: "in-sequence"<br>Insert: --m-sequence-- |
| Column 11, Line 31 | Delete: "in-sequence"<br>Insert: --m-sequence-- |
| Column 12, Line 50 | Delete: "X0T"<br>Insert: --X0I-- |

UNITED STATES PATENT AND TRADEMARK OFFICE
CERTIFICATE OF CORRECTION

PATENT NO. : 7,436,963 B2
APPLICATION NO. : 10/383872
DATED : October 14, 2008
INVENTOR(S) : Daniele Lo Iacono et al.

It is certified that error appears in the above-identified patent and that said Letters Patent is hereby corrected as shown below:

Column 14, Line 32  Delete: "$D^4+D^6D^{15}$"
Insert: --$D^4+D^6+D^{15}$--

Column 14, Line 49  Delete: "$\tau 2^{17}$"
Insert: --$\tau=2^{17}$--

Signed and Sealed this

Thirtieth Day of December, 2008

JON W. DUDAS
*Director of the United States Patent and Trademark Office*